US012142408B2

(12) United States Patent
Kobayashi et al.

(10) Patent No.: US 12,142,408 B2
(45) Date of Patent: Nov. 12, 2024

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP); Seiji Shitama, Mie (JP); Naotoshi Furukawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 771 days.

(21) Appl. No.: 17/288,663

(22) PCT Filed: Nov. 5, 2019

(86) PCT No.: PCT/JP2019/043324
§ 371 (c)(1),
(2) Date: Apr. 26, 2021

(87) PCT Pub. No.: WO2020/100657
PCT Pub. Date: May 22, 2020

(65) Prior Publication Data

US 2021/0398729 A1 Dec. 23, 2021

(30) Foreign Application Priority Data

Nov. 14, 2018 (JP) ................................ 2018-213780

(51) Int. Cl.
*H01F 27/06* (2006.01)
*H01F 27/02* (2006.01)
(Continued)

(52) U.S. Cl.
CPC ........... *H01F 27/06* (2013.01); *H01F 27/022* (2013.01); *H01F 27/266* (2013.01); *H01F 37/00* (2013.01)

(58) Field of Classification Search
CPC ......... H01F 27/266; H01F 27/26; H01F 27/06
(Continued)

(56) References Cited

U.S. PATENT DOCUMENTS 6,690,254 B2 * 2/2004 McGrane ................ H01F 27/02 336/198
6,917,273 B2 * 7/2005 Okamoto .............. H01F 27/255 336/200
(Continued)

FOREIGN PATENT DOCUMENTS

EP 2528073 A1 * 11/2012 ............ B60L 11/182
JP S54-092348 U 6/1979
(Continued)

OTHER PUBLICATIONS

International Search Report issued on Feb. 25, 2020 for WO 2020/100657 A1 (4 pages).

*Primary Examiner* — Shawki S Ismail
*Assistant Examiner* — Joselito S. Baisa
(74) *Attorney, Agent, or Firm* — Venjuris, P.C.

(57) ABSTRACT

A reactor is provided with a coil including a pair of winding portions arranged in parallel, a magnetic core to be arranged inside and outside the winding portions, a case for accommodating an assembly including the coil and the magnetic core, and a sealing resin portion to be filled into the case. The case includes a bottom plate portion on which the assembly
(Continued)

is placed, a side wall portion for surrounding the assembly, and an opening facing the bottom plate portion and having a rectangular planar shape. The pair of winding portions are so arranged that a parallel direction is orthogonal to the bottom plate portion. The reactor includes a supporting member to be arranged along a short side direction of the opening. The supporting member includes end portions to be stopped in contact with facing inner surfaces of the side wall portion.

16 Claims, 9 Drawing Sheets

(51) Int. Cl.
*H01F 27/26* (2006.01)
*H01F 37/00* (2006.01)

(58) Field of Classification Search
USPC ........................................................... 336/65
See application file for complete search history.

(56) References Cited

U.S. PATENT DOCUMENTS

| | | | | |
|---|---|---|---|---|
| 7,427,909 | B2 * | 9/2008 | Ono | H01F 1/24 336/90 |
| 9,786,433 | B2 * | 10/2017 | Suzuki | H01F 27/022 |
| 10,283,255 | B2 | 5/2019 | Yoshikawa | |
| 2009/0108971 | A1 * | 4/2009 | Okamoto | H01F 27/266 336/65 |
| 2010/0102912 | A1 * | 4/2010 | Suzuki | H01F 37/00 336/65 |
| 2016/0225510 | A1 * | 8/2016 | Chen | H01F 27/29 |

FOREIGN PATENT DOCUMENTS

| | | | | | |
|---|---|---|---|---|---|
| JP | H01-133712 | U | | 9/1989 | |
| JP | 2005-072198 | A | | 3/2005 | |
| JP | 2010147067 | A | * | 7/2010 | |
| JP | 2010-177439 | A | | 8/2010 | |
| JP | 2011-040566 | A | | 2/2011 | |
| JP | 2014107294 | A | * | 6/2014 | |
| WO | WO-2011089941 | A1 | * | 7/2011 | B60L 11/182 |

* cited by examiner

REACTOR

CROSS REFERENCE TO RELATED APPLICATIONS

This application is a national phase of PCT application No. PCT/JP2019/043324, filed on 5 Nov. 2019, which claims priority from Japanese patent application No. 2018-213780, filed on 14 Nov. 2018, all of which are incorporated herein by reference.

TECHNICAL FIELD

The present disclosure relates to a reactor.

BACKGROUND

Patent Document 1 describes a reactor including a coil, a magnetic core, a case, a sealing resin portion, and a supporting portion. The magnetic core includes an outer core portion exposed from the coil. The case accommodates an assembly of the coil and the magnetic core inside. The case includes a bottom plate portion on which the assembly is placed, and a side wall portion for surrounding the assembly. Mounting bases on which the supporting portion is mounted are provided on four corner parts of the inner peripheral surface of the side wall portion. The sealing resin portion at least partially seals the assembly by being filled into the case. The supporting portion is arranged to overlap the outer core portion from above and prevents, together with the sealing resin portion, the detachment of the assembly from the case.

PRIOR ART DOCUMENT

Patent Document

Patent Document 1: JP 2016-207701 A

SUMMARY OF THE INVENTION

Problems to be Solved

A reactor according to the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion for surrounding the assembly, and an opening facing the bottom plate portion, the opening having a rectangular planar shape, the pair of winding portions are so arranged that a parallel direction is orthogonal to the bottom plate portion, the reactor includes a supporting member to be arranged along a short side direction of the opening, and the supporting member includes end portions to be stopped in contact with facing inner surfaces of the side wall portion.

Another reactor according to the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion for surrounding the assembly, and an opening facing the bottom plate portion, the opening having a rectangular planar shape, the pair of winding portions are so arranged that axes of the both winding portions are orthogonal to the bottom plate portion, the reactor includes a supporting member to be arranged along a short side direction of the opening, and the supporting member includes end portions to be stopped in contact with facing inner surfaces of the side wall portion.

DETAILED DESCRIPTION TO EXECUTE THE INVENTION

Technical Problem

Figure 1:
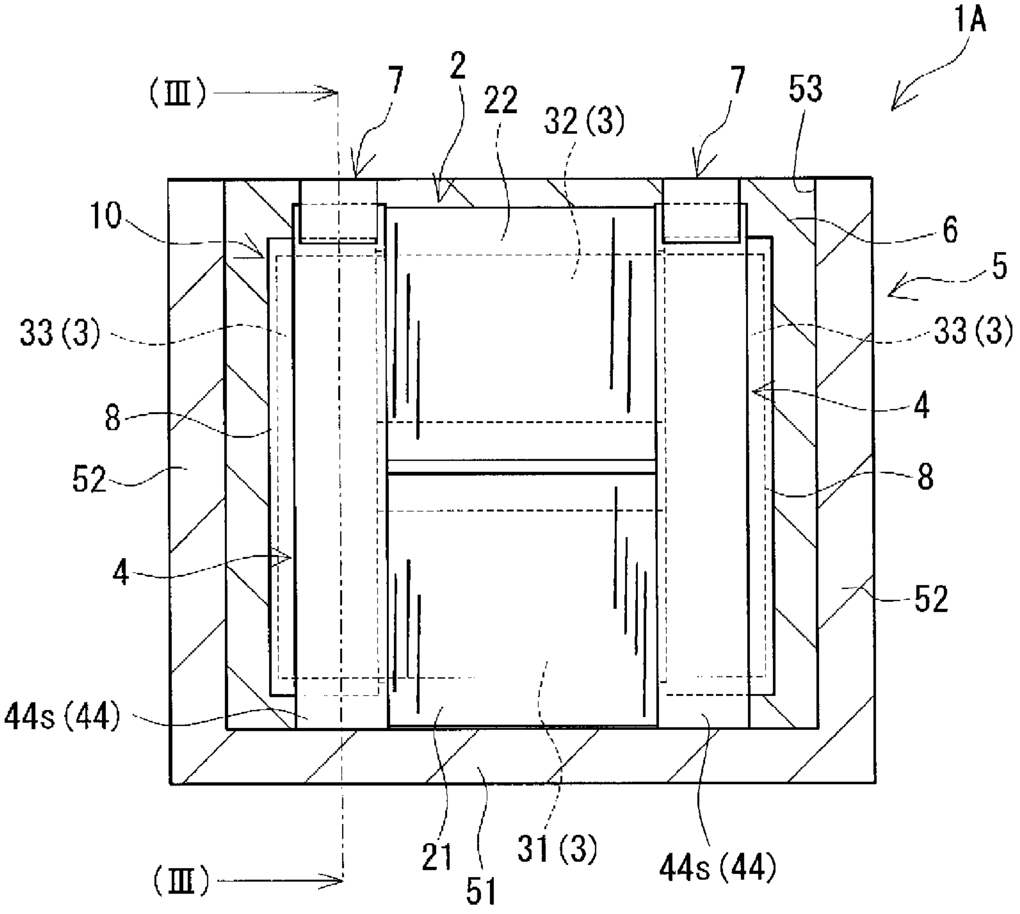
FIG. 1 is a schematic partial section showing an internal structure of a reactor of a first embodiment.

The reactor described in Patent Document 1 includes the mounting bases on the inner peripheral surface of the side wall portion. Thus, an interval between the assembly and the case increases to correspond to installation areas of the mounting bases. If the interval between the assembly and the cases increases, the reactor tends to be enlarged. Further, if the interval between the assembly and the case increases, it is difficult to release heat generated in the assembly to the case.

Accordingly, one object of the present disclosure is to provide a reactor which is small in size and excellent in heat dissipation while preventing the detachment of an assembly including a coil and a magnetic core from a case.

Effect of Present Disclosure

The reactor of the present disclosure is small in size and excellent in heat dissipation while preventing the detachment of the assembly including the coil and the magnetic core from the case.

Description of Embodiments of Present Disclosure

First, embodiments of the present disclosure are listed and described.

(1) A reactor according to an embodiment of the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion for surrounding the assembly, and an opening facing the bottom plate portion, the opening having a rectangular planar shape, the pair of winding portions are so arranged that a parallel direction is orthogonal to the bottom plate portion, the reactor includes a supporting member to be arranged along a short side direction of the opening, and the supporting member includes end portions to be stopped in contact with facing inner surfaces of the side wall portion.

The reactor of the present disclosure includes the supporting member to be arranged along the short side direction of the opening to straddle the opening of the case. Thus, the reactor of the present disclosure can prevent the detachment of the assembly from the case by the supporting member. The supporting member includes the end portions to be stopped in contact with the respective facing inner surfaces of the side wall portion of the case. That is, the supporting member is directly supported on the case without using any fastening member such as a bolt. Thus, the case needs not be provided with a mounting base for mounting the supporting member on the case. Therefore, an interval between the assembly and the case can be made sufficiently narrow as compared to the case where the mounting base is provided. Since the interval between the assembly and the case can be made narrower, the reactor can be reduced in size. Further, since the interval between the assembly and the case can be made narrower, heat generated in the assembly can be easily released to the case and heat dissipation can be improved.

By directly supporting the supporting member on the case, a step of fixing the supporting member to the case by a fastening member or the like can be omitted. Further, the fastening member or the like independent of the supporting member is unnecessary and the number of components can be reduced.

The coil of the reactor of the present disclosure is so arranged that the parallel direction of the pair of winding portions is orthogonal to the bottom plate portion of the case. This arrangement mode is called a vertically stacked type. On the other hand, the coil of the reactor described in Patent Document 1 is so arranged that the parallel direction of the pair of winding portions is parallel to the bottom plate portion of the case. This arrangement mode is called a horizontally placed type. The reactor including the coil of the vertically stacked type can reduce an installation area with respect to the bottom plate portion of the case as compared to the reactor including the coil of the horizontally placed type. Generally, this is because a length of the assembly along a direction orthogonal to both the parallel direction of the pair of winding portions and axial directions of the both winding portions is shorter than a length of the assembly along the parallel direction of the pair of winding portions. Thus, a length of the opening of the case in the short side direction can be made shorter and the reactor of a thin size is easily obtained. Further, the coil of the vertically stacked type can increase facing areas of the winding portions and the case as compared to the coil of the horizontally placed type. Thus, heat generated in the assembly can be easily released to the case and heat dissipation can be improved. Particularly, if the length of the assembly along the parallel direction of the pair of winding portions is longer than a length of the assembly along the axial directions of the winding portions, the reactor including the coil of the vertically stacked type can reduce the installation area with respect to the bottom plate portion of the case as compared to a reactor including a coil of an upright type to be described later.

(2) A reactor according to another embodiment of the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion for surrounding the assembly, and an opening facing the bottom plate portion, the opening having a rectangular planar shape, the pair of winding portions are so arranged that axes of the both winding portions are orthogonal to the bottom plate portion, the reactor includes a supporting member to be arranged along a short side direction of the opening, and the supporting member includes end portions to be stopped in contact with facing inner surfaces of the side wall portion.

Similarly to the reactor described in (1) above, the reactor of the present disclosure is small in size and excellent in heat dissipation while preventing the detachment of the assembly from the case. The coil of the reactor of the present disclosure is so arranged that the both axes of the pair of winding portions are orthogonal to the bottom plate portion of the case. This arrangement mode is called the upright type. The reactor including the coil of the upright type can reduce an installation area with respect to the bottom plate portion of the case as compared to a reactor including a coil of the horizontally placed type. Generally, this is because a length of the assembly along a direction orthogonal to both a parallel direction of the pair of winding portions and axial directions of the both winding portions is shorter than a length of the assembly along the axial directions of the winding portions. Thus, a length of the opening of the case in the short side direction can be made shorter and the reactor of a thin size is easily obtained. Further, the coil of the upright type can increase facing areas of the winding portions and the case as compared to the coil of the horizontally placed type. Thus, heat generated in the assembly can be easily released to the case and heat dissipation can be improved. Particularly, if the length of the assembly along the axial directions of the winding portions is longer than a length of the assembly along the parallel direction of the winding portions, the reactor including the coil of the upright type can reduce the installation area with respect to the bottom plate portion of the case as compared to a reactor including a coil of the vertically stacked type.

(3) As an example of the reactor of the present disclosure, the magnetic core includes an outer core portion to be arranged outside the winding portions, the reactor includes a holding member having a side portion for covering a surface of the outer core portion facing the side wall portion, and the side portion includes a first groove portion, a part of the supporting member being fit into the first groove portion.

The supporting member has regions to be interposed between the assembly and the case so that the end portions are stopped in contact with the inner surfaces of the side wall portion. These regions are called interposed regions below. As the interval between the assembly and the case becomes narrower, the reactor can be more reduced in size. Further, as the interval between the assembly and the case becomes narrower, the heat dissipation of the reactor can be improved. However, if the interval between the assembly and the case is made sufficiently small, it becomes difficult to fit the interposed regions of the supporting member between the assembly and the case and stop the end portions of the supporting members in contact with the inner surfaces of the side wall portion. By providing the holding member with the first groove portion, an accommodation space for the interposed region can be widened by a groove depth of the first groove portion. Thus, the interposed region is easily fit into a space formed by the first groove portion and the end portion of the supporting member is easily stopped in contact with the inner surface of the side wall portion. On the other hand, in a part not provided with the first groove portion, the interval between the assembly and the case can be made sufficiently narrow. The first groove portion is easily formed in the reactor of the present disclosure by including the holding member. This is because, if the first groove portion is provided in the outer core portion, it may affect the passage of magnetic fluxes and reduce magnetic characteristics.

(4) As an example of the reactor of the present disclosure, the side wall portion includes a second groove portion in an inner surface facing the supporting member, a part of the supporting member being fit into the second groove portion.

By providing the second groove portion in the case, the accommodation space for the interposed region of the supporting member can be widened by a groove depth of the second groove portion. Thus, the interposed region is easily fit into a space formed by the second groove portion and the end portion of the supporting member is easily stopped in contact with the inner surface of the side wall portion. On the other hand, in a part not provided with the second groove portion, the interval between the assembly and the case can be made sufficiently narrow.

(5) As an example of the reactor of the present disclosure, the supporting member is made of a metal material having a higher hardness than the side wall portion, and the end portions of the supporting member include parts configured to bite into the respective inner surfaces of the side wall portion.

If the end portions of the supporting member bite into and are stopped in contact with the respective inner surfaces of the side wall portion, the configuration of the supporting member can be simplified. By sharply forming the end portions of the supporting member, biting parts into the respective inner surfaces of the side wall portion can be easily formed.

(6) As an example of the reactor of the present disclosure, one of the end portion of the supporting member and the side wall portion includes a projection projecting toward the other of the end portion of the supporting member and the side wall portion, and a recess is provided in the other of the end portion of the supporting member and the side wall portion, the projection being fit into the recess.

If the end portion of the supporting member is stopped in contact with the inner surface of the side wall portion by the fitting of the projection and the recess, a degree of freedom in selecting a constituent material of the supporting member is high. For example, the supporting member may be made of a metal material or a resin material as long as the projection and the recess can be fit.

(7) As an example of the reactor of the present disclosure, an adhesive layer is provided which is interposed between the assembly and the bottom plate portion.

By including the adhesive layer between the assembly and the bottom plate portion, the assembly can be firmly fixed to the bottom plate portion. Thus, the vibration of the assembly due to vibration or a thermal shock possibly generated when the reactor operates is easily suppressed.

(8) As an example of the reactor of the present disclosure, the magnetic core includes an inner core portion to be arranged inside the winding portions and an outer core portion to be arranged outside the winding portions, and the assembly includes a molded resin portion for at least partially covering a surface of the outer core portion and covering a surface along a circumferential direction on an axial end part of the inner core portion.

By providing the assembly with the molded resin portion, the inner core portion and the outer core portion can be integrally held. The inner core portion is arranged inside the winding portions. By covering the surface of the inner core portion along the circumferential direction on the axial end part by the molded resin portion, the molded resin portion is interposed between the inner core portion and the winding portions. Thus, the coil and the magnetic core can be handled as an integrated body by the molded resin portion.

Details of Embodiments of Present Disclosure

Specific examples of a reactor according to embodiments of the present disclosure are described with reference to the drawings below. The same components are denoted by the same reference signs in the drawings. Note that the present invention is not limited to these illustrations and is intended to be represented by claims and include all changes in the scope of claims and in the meaning and scope of equivalents.

First Embodiment

Figure 2:
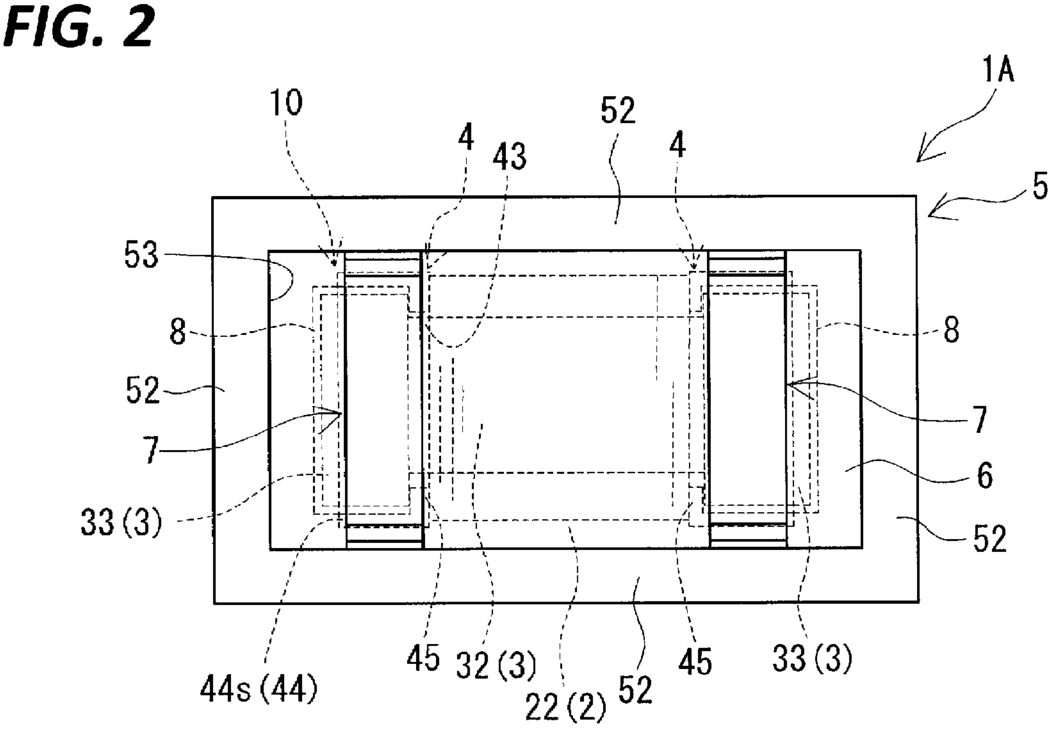
FIG. 2 is a schematic top view showing the reactor of the first embodiment.
Figure 3:
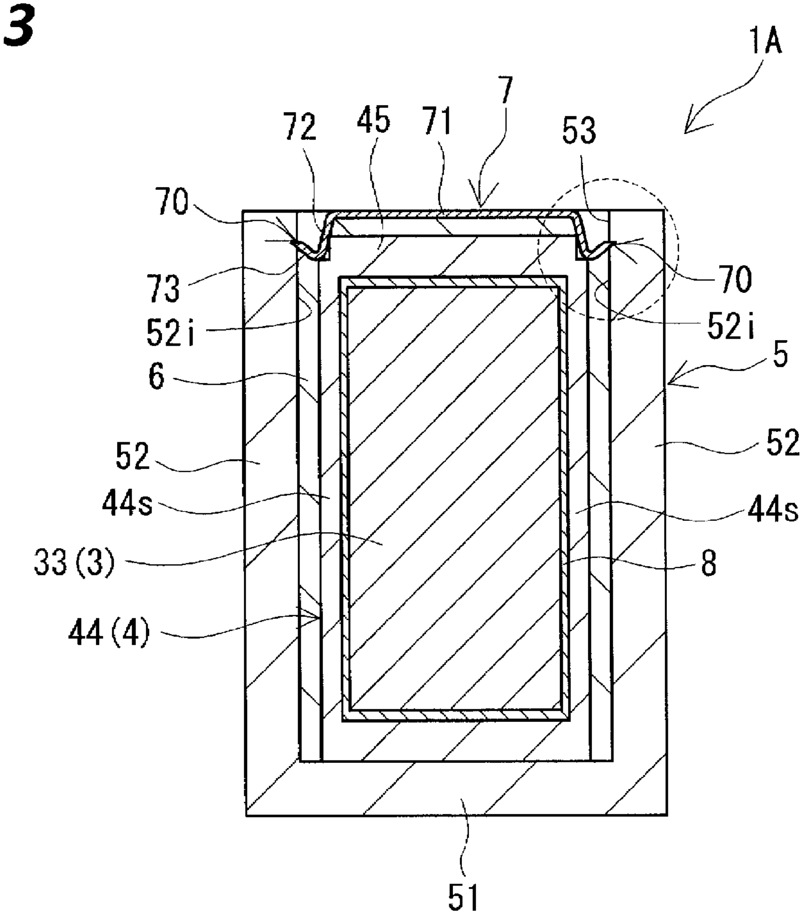
FIG. 3 is a schematic section along (III)-(III) shown in FIG. 1.
Figure 4:
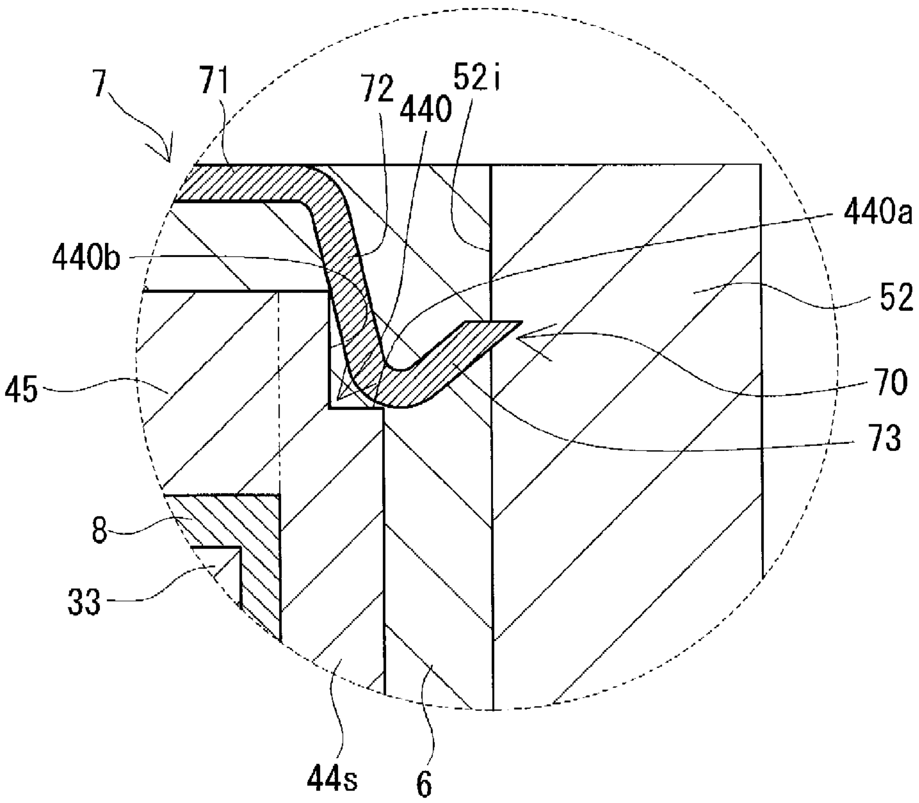
FIG. 4 is a schematic enlarged section showing the vicinity of an end portion of a supporting member provided in the reactor of the first embodiment.

A reactor 1A of a first embodiment is described on the basis of FIGS. 1 to 4. FIG. 1 shows an appearance of an assembly 10 accommodated in a case 5 when viewed from a front side and shows cross-sections of the case 5 and a sealing resin portion 6 cut along a plane parallel to the front side. The same holds for FIGS. 8 and 9. In FIGS. 3 and 4, an interval between the assembly 10 and the case 5 is shown to be wider than an actual interval for the sake of description. The same holds for FIGS. 5 to 7 and 10.

<<Summary>>

The reactor 1A of the first embodiment includes a coil 2, a magnetic core 3, the case 5 and the sealing resin portion 6 as shown in FIGS. 1 and 2. As shown in FIG. 1, the coil 2 includes a pair of winding portions 21, 22 arranged in parallel. The magnetic core 3 includes inner core portions 31, 32 to be arranged inside the winding portions 21, 22 and outer core portions 33 to be arranged outside the winding portions 21, 22. The case 5 accommodates the assembly 10 including the coil 2 and the magnetic core 3. The sealing resin portion 6 is filled into the case 5. The reactor 1A of this example further includes holding members 4. The holding members 4 are members for holding the coil 2 and the magnetic core 3 in a positioned state. In the reactor 1A of this example, the assembly 10 is integrated by a molded resin portion 8. One of features of the reactor 1A of the first embodiment is that the coil 2 is of a vertically stacked type to be described later. Another feature of the reactor 1A of the first embodiment is to include supporting members 7 for preventing the detachment of the assembly 10 from the case 5. As shown in FIGS. 3 and 4, the supporting member 7 includes end portions 70 to be stopped in contact with facing inner surfaces 52*i* of a side wall portion 52 of the case 5. The configuration of the reactor 1A is described in detail below.

<<Coil>>

As shown in FIG. 1, the coil 2 includes the tubular winding portions 21, 22 formed by spirally winding a winding wire. The coil 2 including a pair of the winding portions 21, 22 comes in the following two forms. The first form includes winding portions 21, 22 respectively formed by two independent winding wires and a connecting portion connecting one end parts of both end parts of the winding wires pulled out from the winding portions 21, 22. The connecting portion is formed by directly joining the end parts of the winding wires by welding, crimping or the like. Besides that, the connecting portion may be formed by indirectly connecting the end parts via a suitable fitting or the like. The second form includes winding portions 21, 22 formed by one continuous winding wire and a coupling portion made of a part of the winding wire extending between the winding portions 21, 22 and coupling the winding portions 21, 22. In either form, the end parts of the winding wire extending from each winding portion 21, 22 are pulled out to the outside of the case 5 and utilized as parts to be connected to an external device such as a power supply. Note that only the winding portions 21, 22 are shown and the end parts of the winding wires, the connecting portion or coupling portion are not shown for the sake of description in FIG. 1 and FIGS. 8 and 9 to be described later.

Examples of the winding wire include a coated wire including a conductor wire and an insulation coating covering the outer periphery of the conductor wire. Examples of the material of the conductor wire include copper. Examples of the constituent material of the insulation coating include resins such as polyamide-imide. Specific examples of the coated wire include coated flat rectangular wires having a rectangular cross-sectional shape and coated round wires having a circular cross-sectional shape. Specific examples of the winding portions 21, 22 made of the flat rectangular wire include edge-wise coils.

The winding wire of this example is a coated flat rectangular wire. The winding portions 21, 22 of this example are edge-wise coils. In this example, the specifications such as the shapes, winding directions, numbers of turns of the winding portions 21, 22 are equal. Note that the shapes, sizes and the like of the winding wire and the winding portions 21, 22 can be changed as appropriate. For example, the winding wire may be a coated round wire. Further, the specifications of the respective winding portions 21, 22 may be different.

The winding portions 21, 22 may have a rectangular end surface shape. That is, each winding portion 21, 22 includes four corner parts and a pair of long straight portions and a pair of short straight portions connecting between the corner parts. The pair of long straight portions are arranged to face each other, and the pair of short straight portions are arranged to face each other. The end surface shape of the winding portion 21, 22 may have a race track shape with four rounded corner parts. Since the winding portions 21, 22 include the straight portions, the outer peripheral surfaces of the winding portions 21, 22 can be substantially formed by flat surfaces. Thus, the flat surfaces of the winding portions 21, 22 and the flat surfaces of the case 5 can face each other. Since the flat surfaces face each other, intervals between the winding portions 21, 22 and the case 5 are easily uniformly narrowed.

The coil 2 of this example is of the vertically stacked type. As shown in FIG. 1, the coil 2 of the vertically stacked type is so arranged that a parallel direction of the pair of winding portions 21, 22 is orthogonal to a bottom plate portion 51 of the case 5. That is, the pair of winding portions 21, 22 are arranged to be stacked in a depth direction of the case 5. One winding portion 21 is arranged on the side of the bottom plate portion 51, and the other winding portion 22 is arranged on the side of an opening 53 of the case 5. The reactor 1A including the coil 2 of the vertically stacked type can reduce an installation area of the winding portions 21, 22 with respect to the bottom plate portion 51 of the case 5 as compared to a reactor including a coil of a horizontally placed type. The coil of the horizontally placed type is so arranged that a parallel direction of a pair of winding portions is parallel to a bottom plate portion of a case. Patent Document 1 is referred to for the coil of the horizontally placed type. Generally, this is because a length of the assembly 10 along a direction orthogonal to both the parallel direction of the pair of winding portions 21, 22 and axial directions of the both winding portions 21, 22 is shorter than a length of the assembly 10 along the parallel direction of the pair of winding portions 21, 22. Thus, the reactor 1A including the coil 2 of the vertically stacked type is long in a direction orthogonal to the bottom plate portion 51, and short in a direction orthogonal to both the direction orthogonal to the bottom plate portion 51 and the axial directions of the winding portions 21, 22. That is, the reactor 1A including the coil 2 of the vertically stacked type is thin. Particularly, if the outer peripheral surfaces of the winding portions 21, 22 are substantially formed by flat surfaces, facing areas of the winding portions 21, 22 and the case 5 can be increased. In addition, if the outer peripheral surfaces of the winding portions 21, 22 are substantially formed by flat surfaces, the intervals between the winding portions 21, 22 and the case 5 can be made substantially uniform. Therefore, the reactor 1A including the coil 2 of the vertically stacked type can easily dissipate heat generated in the assembly 10 to the case 5 and can be improved in heat dissipation.

<<Magnetic Core>>

As shown in FIG. 1, the magnetic core 3 includes two inner core portions 31, 32 and two outer core portions 33. The inner core portions 31, 32 are respectively arranged inside the winding portions 21, 22. The outer core portions 33 are arranged outside the winding portions 21, 22. The magnetic core 3 is configured such that the two outer core portions 33 are arranged across the two inner core portions 31, 32 arranged apart from each other. The magnetic core 3 is formed into an annular shape by bringing the end surfaces of the respective inner core portions 31, 32 and the inner end surfaces of the outer core portions 33 into contact. By these two inner core portions 31, 32 and two outer core portions 33, a closed magnetic path is formed when the coil 2 is excited.

[Inner Core Portions]

The inner core portions 31, 32 are parts of the magnetic core 3 extending along the axial directions of the winding portions 21, 22. In this example, both end parts of each inner core portion 31, 32 project from the end surfaces of the winding portion 21, 22. These projecting parts are also parts of the inner core portions 31, 32. The end parts of the inner core portions 31, 32 projecting from the winding portions 21, 22 are inserted into through holes 43 of the holding members 4 to be described later as shown in FIG. 2.

Each inner core portion 31, 32 of this example is in the form of a rectangular parallelepiped substantially corresponding to the inner peripheral shape of the winding portion 21, 22. Further, the inner core portions 31, 32 of this example respectively have the same shape and the same size. Furthermore, each of the inner core portions 31, 32 of this example is an integrated body having an undivided structure.

[Outer Core Portions]

The outer core portions 33 are parts of the magnetic core 3 to be arranged outside the winding portions 21, 22. The shapes of the outer core portions 33 are not particularly limited as long as the outer core portions 33 are shaped to connect the end parts of the two inner core portions 31, 32. Each of the outer core portions 33 of this example is substantially in the form of a rectangular parallelepiped. Further, the outer core portions 33 of this example respectively have the same shape and the same size. Furthermore, each of the outer core portions 33 of this example is an integrated body having an undivided structure.

[Constituent Materials]

The inner core portions 31, 32 and the outer core portions 33 may be formed by compacts including a soft magnetic material. Examples of the soft magnetic material include metals such as iron and iron alloy and non-metals such as ferrite. The iron alloy is, for example, a Fe—Si alloy, a Fe—Ni alloy or the like. The compact may be a powder compact formed by compression-molding a powder made of a soft magnetic material and further a coated powder including an insulation coating. Further, the compact may be a compact of a composite material obtained by solidifying a fluid mixture containing a soft magnetic material and a resin. Furthermore, the compact may be a sintered body such as a ferrite core, a laminate formed by laminating plate materials such as electromagnetic steel plates or the like.

The constituent material of the inner core portions 31, 32 and that of the outer core portions 33 may be the same or may be different. An example in which the constituent materials are different is that the inner core portions 31, 32 are compacts of a composite material and the outer core portions 33 are powdered compacts. Another example is that both the inner core portions 31, 32 and the outer core portions 33 are compacts of composite materials, but the type and content of a soft magnetic material are different.

<<Holding Members>>

The holding members 4 are members for holding the coil 2 and the magnetic core 3 in the positioned state. The holding members 4 are typically made of an electrically insulating material and contribute to an improvement in electrical insulation between the coil 2 and the magnetic core 3. As shown in FIGS. 1 and 2, the holding members 4 include the holding member 4 for holding one end surfaces of the both winding portions 21, 22 and one outer core portion 33, and the holding member 4 for holding the other end surfaces of the both winding portions 21, 22 and the other outer core portion 33. Each holding member 4 has the same basic configuration. The holding member 4 of this example include an end surface portion 45 and an outer peripheral portion 44.

The end surface portion 45 has a part facing the end surfaces of the winding portions 21, 22. As shown in FIG. 2, the end surface portion 45 is a B-shaped frame-like member having the through hole 43 penetrating from a side where the outer core portion 33 is arranged to a side where the winding portions 21, 22 are arranged. The periphery of the through hole 43 in the end surface portion 45 faces the end surfaces of the winding portions 21, 22. The end parts of the inner core portions 31, 32 are inserted into the through hole 43. Four corners of the through hole 43 are shaped substantially in conformity with corner parts of the end surfaces of the inner core portions 31, 32. The inner core portions 31, 32 are held in the through hole 43 by these four corners of the through hole 43. The end surface portion 45 has parts expanded further outward than a contour line of the end surface of the inner core portion 31 on edge parts connecting these four corners of the through hole 43. With the inner core portions 31, 32 inserted in the through hole 43, unillustrated clearances penetrating through the end surface portion 45 are formed in those expanded parts. These clearances function as resin filling holes for introducing a resin into between the winding portions 21, 22 and the inner core portions 31, 32 in forming the molded resin portion 8. The end surfaces of the inner core portions 31, 32 inserted into the through hole 43 are substantially flush with a surface of the end surface portion 45 on the side where the outer core portion 33 is arranged.

As shown in FIGS. 1 and 2, the outer peripheral portion 44 projects toward the outer core portion 33 from a peripheral edge part of the end surface portion 45. The inner end surface of the outer core portion 33 and the vicinity thereof are fit into the inside of the outer peripheral portion 44. That is, the outer peripheral portion 44 covers the outer periphery of the outer core portion 33. The inside of the outer peripheral portion 44 has parts along a contour line of the outer core portion 33 and parts expanded further outward from the contour line of the outer core portion 33. The outer core portion 33 is held in the outer peripheral portion 44 by the parts along the contour line. The parts expanded further outward than the contour line function as flow passages for introducing the resin into clearances formed between the through hole 43 of the end surface portion 45 and the inner core portions 31, 32 in molding the molded resin portion 8 to be described later. The inner end surface of the outer core portion 33 fit into the inside of the outer peripheral portion 44 contacts the surface of the end surface portion 45 on the side where the outer core portion 33 is arranged. Thus, with the inner core portions 31, 32 and the outer core portion 33 held by the holding member 4, the end surfaces of the inner core portions 31, 32 and the inner end surface of the outer core portion 33 are in contact.

As shown in FIG. 3, the outer peripheral portion 44 includes two side portions **44*s* covering surfaces of the outer core portion 33 facing the side wall portion 52 of the case 5. In this example, the side portion 44*s* includes a first groove portion 440 into which a part of the supporting member 7 to be described later is fit. As shown in FIG. 4, the first groove portion 440 is formed by a cut formed in a corner part of the side portion 44*s*. By this cut, the first groove portion 440 has a first surface 440*a* forming a step to a surface of the side portion 44*s* on the side of the opening 53 of the case 5. The first groove portion 440 also has a second surface 440*b* forming a step to a surface of the side portion 44*s* on the side of the side wall portion 52 of the case 5. In this example, the first groove portion 440 is formed by the cut in which the first and second surfaces 440*a*, 440*b* are orthogonal. This first groove portion 440 is described in detail when the supporting member 7** is described later.

The shape, the size and the like of the holding member 4 can be changed as appropriate if the aforementioned functions are provided. Further, a known configuration can be utilized for the holding member 4. For example, the holding member 4 may include an inner member to be arranged between the winding portions 21, 22 and the inner core portions 31, 32. The inner member may be shaped similarly to an inner interposed portion of Patent Document 1.

The holding members 4 can be, for example, made of a thermoplastic resin such as a polyphenylene sulfide (PPS) resin, a polytetrafluoroethylene (PTFE) resin, a liquid crystal polymer (LCP), a polyamide (PA) resin such as nylon 6 or nylon 66, a polybutylene terephthalate (PBT) resin or an acrylonitrile butadiene styrene (ABS) resin. Besides, the holding members 4 can also be made of a thermosetting resin such as an unsaturated polyester resin, an epoxy resin, a urethane resin or a silicone resin. The heat dissipation of the holding members 4 may be improved by containing a ceramic filler in these resins. A non-magnetic powder of alumina, silica or the like can be utilized as the ceramic filler.

<<Molded Resin Portion>>

The molded resin portion 8 at least partially covers the surface of the magnetic core 3 and integrally holds the inner core portions 31, 32 and the outer core portions 33. The molded resin portion 8 at least partially covers the surfaces of the outer core portions 33 and covers surfaces extending along a circumferential direction on axial end parts of the inner core portions 31, 32. The molded resin portion 8 may not extend up to axially central parts of the inner core portions 31, 32. In view of the function of the molded resin portion 8 to integrally hold the inner core portions 31, 32 and the outer core portions 33, a sufficient formation range of the molded resin portion 8 is up to the vicinity of the end parts of the inner core portions 31, 32. Note that the molded resin portion 8 may extend up to the axially central parts of the inner core portions 31, 32. That is, the molded resin portion 8 may cover the surfaces of the inner core portions 31, 32 and be formed from the one outer core portion 33 to the other outer core portion 33. The molded resin portion 8 of this example covers all the surfaces of the outer core portions 33 except the inner end surfaces and covers the surfaces extending along the circumferential direction near the end parts of the inner core portions 31, 32, but does not extend up to the axial central parts of the inner core portions 31, 32.

A thermosetting resin such as an epoxy resin, a phenol resin, a silicone resin or a urethane resin, a thermoplastic resin such as a PPS resin, a PA resin, a polyimide resin or a fluororesin, a room temperature setting resin or a low temperature setting resin can be, for example, utilized for the molded resin portion 8. The heat dissipation of the molded resin portion 8 may be improved by containing a ceramic filler such as alumina or silica in these resins.

<<Case>>

The case 5 has functions of mechanically protecting the assembly 10, protecting the assembly 10 from an external environment, and improving the corrosion resistance of the assembly 10 and other functions. The case 5 is typically made of a metal material and contributes to an improvement in heat dissipation for releasing heat generated in the assembly 10 to outside.

The case 5 includes the bottom plate portion 51, the side wall portion 52 and the opening 53. The bottom plate portion 51 is a flat plate member on which the assembly 10 is placed. The side wall portion 52 is a frame-like member for surrounding the assembly 10. The case 5 is a bottomed tubular container in which an accommodation space for the assembly 10 is formed by the bottom plate portion 51 and the side wall portion 52 and the opening 53 is formed on a side facing the bottom plate portion 51. In this example, the bottom plate portion 51 and the side wall portion 52 constitute an integrated body by being integrally molded.

The inner bottom surface of the bottom plate portion 51 in contact with the assembly 10 and inner surfaces 52*i* of the side wall portion 52 are both flat surfaces. The opening 53 is facing the bottom plate portion 51 and, as shown in FIG. 2, has a rectangular planar shape. In this example, the bottom plate portion 51 also has a rectangular planar shape having the same dimensions as the planar shape of the opening 53. That is, the case 5 of this example has a planar shape uniform in the depth direction. The assembly 10 is so arranged that the axial directions of the winding portions 21, 22 extend along a long side direction of the case 5.

A length of the case 5 along the long side direction is, for example, 80 mm or more and 120 mm or less. A length of the case 5 along a short side direction is, for example, 40 mm or more and 80 mm or less. Further, a length of the case 5 along the depth direction, i.e. a height of the case 5, is, for example, 80 mm or more and 150 mm or less. A volume of the reactor 1A may be 250 $cm^3$ or more and 1450 $cm^3$ or less.

An interval between the assembly 10 and the side wall portion 52 may be 0.5 mm or more or 1 mm or less. The interval between the assembly 10 and the side wall portion 52 here is an interval between the holding members 4 and the side wall portion 52. This is because the holding members 4 are members closest to the side wall portion 52, out of the assembly 10. By setting the interval to 0.5 mm or more, the constituent resin of the sealing resin portion 6 to be described later is easily filled between the assembly 10 and the side wall portion 52. On the other hand, by setting the interval to 1 mm or less, the reactor 1A of a small size is easily obtained. Further, by setting the interval to 1 mm or less, the intervals between the winding portions 21, 22 and the side wall portion 52 can be narrowed and the reactor 1A excellent in heat dissipation is easily obtained.

The case 5 can be made of a non-magnetic metal material such as aluminum or aluminum alloy.

<<Sealing Resin Portion>>

The sealing resin portion 6 is filled into the case 5 to at least partially cover the assembly 10. Specifically, the sealing resin portion 6 is disposed in the interval between the assembly 10 and the case 5. The sealing resin portion 6 has functions of mechanically protecting the assembly 10, protecting the assembly 10 from an external environment and improving corrosion resistance. The sealing resin portion 6 also has a function of improving the strength and rigidity of the reactor 1A by the integration of the assembly 10 and the case 5. The sealing resin portion 6 also has a function of improving electrical insulation between the assembly 10 and the case 5. The sealing resin portion 6 also has a function of improving heat dissipation by transferring the heat of the assembly 10 to the case 5.

The constituent resin of the sealing resin portion 6 is, for example, an epoxy resin, a urethane resin, a silicone resin, an unsaturated polyester resin, a PPS resin or the like. The constituent resin containing a filler excellent in thermal conductivity or a filler excellent in electrical insulation in addition to the above resin component can be utilized for the sealing resin portion 6. The filler is made of a non-metal inorganic material, for example, a non-metal element such as ceramics or carbon nano tubes made of alumina, silica, an oxide such as magnesium oxide, a nitride such as silicon nitride, aluminum nitride or boron nitride or a carbide such as silicon carbide. Besides, known resin compositions can be utilized for the sealing resin portion 6.

<<Supporting Members>>

The supporting members 7 are members for preventing the detachment of the assembly 10 from the case 5. As shown in FIG. 2, the supporting members 7 are arranged along the short side direction of the opening 53 of the case 5. As shown in FIGS. 3 and 4, the supporting member 7 includes the end portions 70 to be stopped in contact with the respective facing inner surfaces 52*i* of the side wall portion 52 of the case 5.

The supporting member 7 of this example is a plate-like member including an upper piece 71, side pieces 72 and folded pieces 73 as shown in FIG. 3. The upper piece 71 is a part extending in the short side direction of the opening 53 of the case 5 and straddling an upper part of the assembly 10. The side pieces 72 are parts extending in a direction intersecting the upper piece 71 from both end parts of the upper piece 71 and arranged along side parts of the assembly 10. In this example, the upper piece 71 and the side pieces 72 intersect at an obtuse angle. The folded pieces 73 are parts folded outwardly of the side pieces 72 from end parts of the side pieces 72 opposite to end parts connected to the upper piece 71 and obliquely extending to lateral sides of the assembly 10 from the end parts of the side pieces 72. A V-shaped cross-sectional shape is formed by the side piece 72 and the folded piece 73. The supporting member 7 has a substantially square bracket-shaped, i.e. [-shaped, cross-sectional shape. Springiness is imparted to the side piece 72 and the folded piece 73 by this cross-sectional shape. Thus, the supporting member 7 is preferably made of spring steel. The side piece 72 and the folded piece 73 are interposed between the assembly 10 and the case 5. Regions of the supporting member 7 to be interposed between the assembly 10 and the case 5 are called interposed regions below. In this example, as shown in FIG. 3, the supporting member 7 is arranged to face the outer peripheral portion 44 of the holding member 4 over the entire upper piece 71 and interposed regions.

The end portion 70 to be stopped in contact with the inner surface 52*i* of the side wall portion 52 is provided on a tip part of the folded piece 73. In this example, the end portion 70 of the supporting member 7 is stopped in contact with the inner surface 52*i* by pressing the inner surface 52*i* of the side wall portion 52 by springiness. In this example, the end portion 70 of the supporting member 7 has an inclined surface at an acute angle to the inner surface 52*i* of the side wall portion 52. This inclined surface is inclined to approach the opening 53 toward the inner surface 52*i* of the side wall portion 52. An acute-angle part of the end portion 70 of the supporting member 7 bites into and is stopped in contact with the inner surface 52*i* of the side wall portion 52. This inclined surface easily bites into the inner surface 52*i* as compared to an inclined surface approaching the bottom plate portion 51 toward the inner surface 52*i* of the side wall portion 52. In this example, the supporting member 7 is made of spring steel having a higher hardness than aluminum, which is the material of the case 5. Thus, the end portion 70 of the supporting member 7 easily bites into and is stopped in contact with the inner surface 52*i* of the side wall portion 52.

A thickness of the supporting member 7 is, for example, 0.5 mm or more and 1 mm or less. By setting the thickness of the supporting member 7 to 0.5 mm or more, the detachment of the assembly 10 from the case 5 is easily prevented by the supporting member 7. On the other hand, by setting the thickness of the supporting member 7 to 1 mm or less, the interposed regions of the supporting member 7 are easily fit between the assembly 10 and the case 5.

The interposed region of the supporting member 7 is configured by overlapping the side piece 72 and the folded piece 73. Further, the interposed region of the supporting member 7 has springiness by having the side piece 72 and the folded piece 73. Thus, the interposed region of the supporting member 7 has a thickness more than twice the thickness of the supporting member 7 even in a compressed state in which the side piece 72 and the folded piece 73 are close to each other. Here, the interval between the holding member 4 and the side wall portion 52 may be 0.5 mm or more and 1 mm or less as described above. It is difficult to fit the interposed region of the supporting member 7 having the above thickness into this interval. In this example, the side portion 44*s* of the holding member 4 includes the first groove portion 440. By providing the side portion 44*s* with the first groove portion 440, an accommodation space for the interposed region of the supporting member 7 can be widened by a groove depth of the first groove portion 440. In addition, in a part not including the first groove portion 440, the interval between the assembly 10 and the case 5 can be set at the above interval, which is sufficiently narrow. The groove depth of the first groove portion 440 can be appropriately selected to such an extent that the interposed region of the supporting member 7 can be accommodated.

A width of the supporting member 7 may be 10 mm or more and 20 mm or less. By setting the width of the supporting member 7 to 10 mm or more, the detachment of the assembly 10 from the case 5 is easily prevented by the supporting member 7. On the other hand, by setting the width of the supporting member 7 to 20 mm or less, a material constituting the supporting member 7 can be reduced. If the interposed regions of the supporting member 7 are accommodated into the first groove portions 440, the width of the supporting member 7 can be appropriately selected to such an extent that the interposed regions of the supporting member 7 can be accommodated in the first groove portions 440.

In this example, the upper piece 71 of the supporting member 7 is not in contact with the upper part of the assembly 10. Thus, a part of the sealing resin portion 6 is interposed between the upper piece 71 of the supporting member 7 and the assembly 10. That is, the supporting member 7 is at least partially embedded in the sealing resin portion 6. Thus, the supporting member 7 is firmly fixed by the sealing resin portion 6. The supporting member 7 can also be arranged to press the assembly 10 toward the bottom plate portion 51 of the case 5.

<<Manufacturing Method of Reactor>>

The aforementioned reactor 1A can be, for example, manufactured via a step of preparing the assembly 10, a step of accommodating the assembly 10 into the case 5, a step of arranging the supporting members 7 and a step of forming the sealing resin portion 6 in the case 5.

In the step of preparing the assembly 10, the coil 2, the magnetic core 3 and the holding members 4 are assembled to form the assembly 10. At this time, the assembly 10 is integrated by the molded resin portion 8. Specifically, the outer peripheral surfaces of the outer core portions 33 are covered by the molded resin portion 8 with the coil 2 and the magnetic core 3 held positioned by the holding members 4. The resin flow passages are provided inside the outer peripheral portions 44 of the holding members 4. Further, the end surface portions 45 of the holding members 4 include the clearances penetrating through the end surface portions 45. Parts of the molded resin portion 8 are also interposed between the winding portions 21, 22 and the inner core portions 31, 32 by the above flow passages and clearances. The winding portions 21, 22 are exposed from the molded resin portion 8.

The prepared assembly 10 is accommodated into the case 5. At this time, the assembly 10 is so accommodated into the case 5 that the coil 2 is of the vertically stacked type.

The supporting members 7 are so arranged along the short side direction of the opening 53 as to straddle the opening 53 of the case 5. In this example, the supporting members 7 are so arranged that parts of the interposed regions of the supporting members 7 are accommodated in the first groove portions 440 formed in the holding members 4. The end portions 70 of the supporting members 7 bite into and are stopped in contact with the inner surfaces 52*i* of the side wall portion 52.

After the supporting members 7 are arranged, the uncured constituent resin of the sealing resin portion 6 is filled into the case 5 having the assembly 10 accommodated therein. The constituent resin is filled in a vacuum tank. The constituent resin is introduced from below the case 5, for example, by inserting a tube, serving as an inlet for the constituent resin, into the clearance between the assembly 10 and the side wall portion 52 and causing an opening of the tube to be open near the bottom plate portion 51. The liquid surface of the constituent resin introduced into between the assembly 10 and the side wall portion 52 ascends from a lower side toward an upper side of the case 5 to cover the outer periphery of the coil 2 and that of the magnetic core 3. In this state, the constituent resin is cured, thereby sealing the assembly 10.

<<Use Mode>>

The reactor 1A can be utilized as a component of a circuit for performing a voltage stepping-up operation and a voltage stepping-down operation. The reactor 1A can be, for example, used as a constituent component of various converters and power converters. Examples of the converters include in-vehicle converters mounted in vehicles such as hybrid vehicles, plug-in hybrid vehicles, electric vehicles and fuel cell vehicles and converters of air conditioners. The in-vehicle converter is typically a DC-DC converter. The reactor 1A may be, for example, so arranged that the opening 53 of the case 5 is located below.

<<Effects>>

In the reactor 1A of the first embodiment, the coil 2 is of the vertically stacked type. The coil 2 of the vertically stacked type can reduce an installation area with respect to the bottom plate portion 51 of the case 5 as compared to a coil of the horizontally placed type. Thus, a length in the short side direction of the opening 53 of the case 5 can be reduced and the reactor 1A of a thin size is easily obtained. Further, the coil 2 of the vertically stacked type can increase facing areas of the winding portions 21, 22 and the case 5 as compared to the coil of the horizontally placed type. Thus, heat generated in the assembly 10 can be easily released to the case 5 and heat dissipation can be improved.

Further, the reactor 1A of the first embodiment includes the supporting members 7 to be arranged along the short side direction of the opening 53 to straddle the opening 53 of the case 5. Thus, the reactor 1A can prevent the detachment of the assembly 10 from the case 5 by the supporting members 7. The supporting member 7 includes the end portions 70 to be stopped in contact with the respective facing inner surfaces 52*i* of the side wall portion 52 of the case 5. These end portions 70 bite into and are stopped in contact with the inner surfaces 52*i* of the side wall portion 52. Thus, in the reactor 1A, the supporting members 7 can be directly supported on the case 5 by a simple configuration. In the reactor 1A, the supporting members 7 are directly supported on the case 5 without using any fastening member such as bolts. Thus, the case 5 needs not be provided with mounting bases for mounting the supporting members 7 on the case 5. Therefore, the interval between the assembly 10 and the case 5 can be made sufficiently narrow as compared to the case where mounting bases are provided. By narrowing the interval between the assembly 10 and the case 5, the reactor 1A of a small size is easily obtained. Further, by narrowing the interval between the assembly 10 and the case 5, heat generated in the assembly 10 is easily released to the case 5 and the reactor 1A excellent in heat dissipation is easily obtained.

Further, the reactor 1A of the first embodiment includes the first groove portions 440 in the side portions 44*s* of the holding members 4. By providing the first groove portions 440 in the side portions 44*s*, the accommodation spaces for the interposed regions of the supporting members 7 can be widened by the groove depth of the first groove portions 440. In addition, in the parts not provided with the first groove portion 440, the interval between the assembly 10 and the case 5 can be made sufficiently narrow without considering the interposition of the supporting members 7. Thus, the interval between the assembly 10 and the case 5 can be narrowed and, in addition, the interposed regions are easily fit into the spaces formed by the first groove portions 440 and the end portions 70 of the supporting members 7 are easily stopped in contact with the inner surfaces 52*i* of the side wall portion 52.

Second Embodiment

Figure 5:
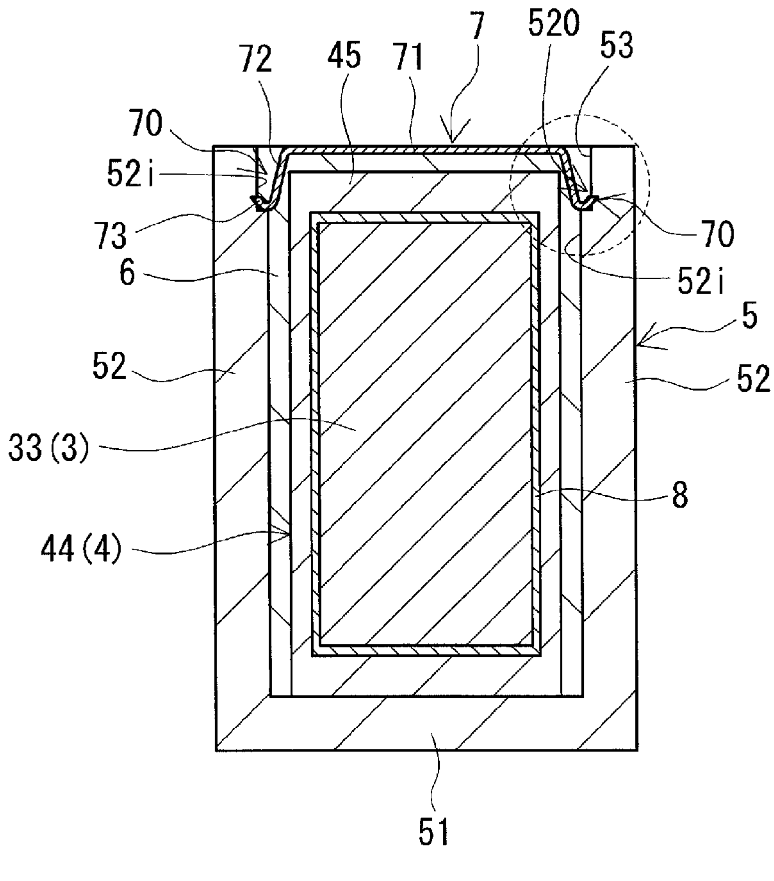
FIG. 5 is a schematic section showing a reactor of a second embodiment.
Figure 6:
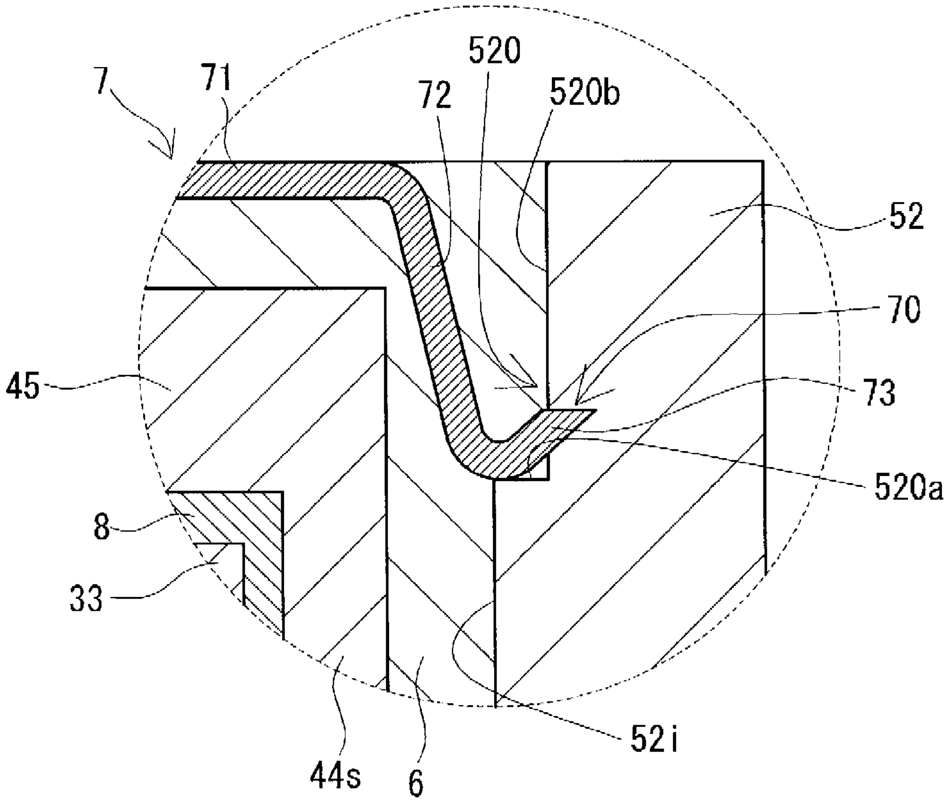
FIG. 6 is a schematic enlarged section showing the vicinity of an end portion of a supporting member provided in the reactor of the second embodiment.

A reactor of a second embodiment is described on the basis of FIGS. 5 and 6. The reactor of the second embodiment differs from the first embodiment in formation regions of groove portions for securing accommodation spaces for interposed regions of supporting members 7. The configuration other than the formation regions of the groove portions is the same as in the first embodiment and not described.

In this example, a side wall portion 52 of a case 5 includes second groove portions 520, into which parts of the supporting members 7 are fit, in inner surfaces 52*i* facing the supporting members 7. As shown in FIG. 5, the second groove portion 520 is a cut formed in a ridge part between the upper end surface of a long side of the side wall portion 52 and the inner surface 52*i*. As shown in FIG. 6, the second groove portion 520 has a first surface 520*a* forming a step to a surface of the side wall portion 52 on the side of an opening 53 of the case 5 by this cut. The second groove portion 520 also has a second surface 520*b* forming a step to the inner surface 52*i* in a part of the side wall portion 52 where the second groove portion 520 is not formed. In this example, the second groove portion 520 is formed by the cut in which the first and second surfaces 520*a*, 520*b* are orthogonal. The end portion 70 of the supporting member 7 is stopped in contact with the second surface 520*b*. By providing the second groove portions 520 in the side wall portion 52, accommodation spaces for the interposed regions of the supporting members 7 can be widened by a groove depth of the second groove portions 520. In addition, in a part not provided with the second groove portion 520, an interval between an assembly 10 and the case 5 can be set at the above interval, which is sufficiently narrow. The groove depth of the second groove portion 520 can be appropriately selected to such an extent that the interposed region of the supporting member 7 can be accommodated.

In this example, side portions 44*s* of holding members 4 do not include the first groove portions 440 shown in FIG. 4. The first groove portions 440 may be provided in the side portions 44*s* of the holding members 4 and the second groove portions 520 may be provided in the side wall portion 52. In this case, the sum of the groove depth of the first groove portion 440 and that of the second groove portion 520 may be appropriately selected to such an extent that the interposed region of the supporting member 7 can be accommodated.

Third Embodiment

Figure 7:
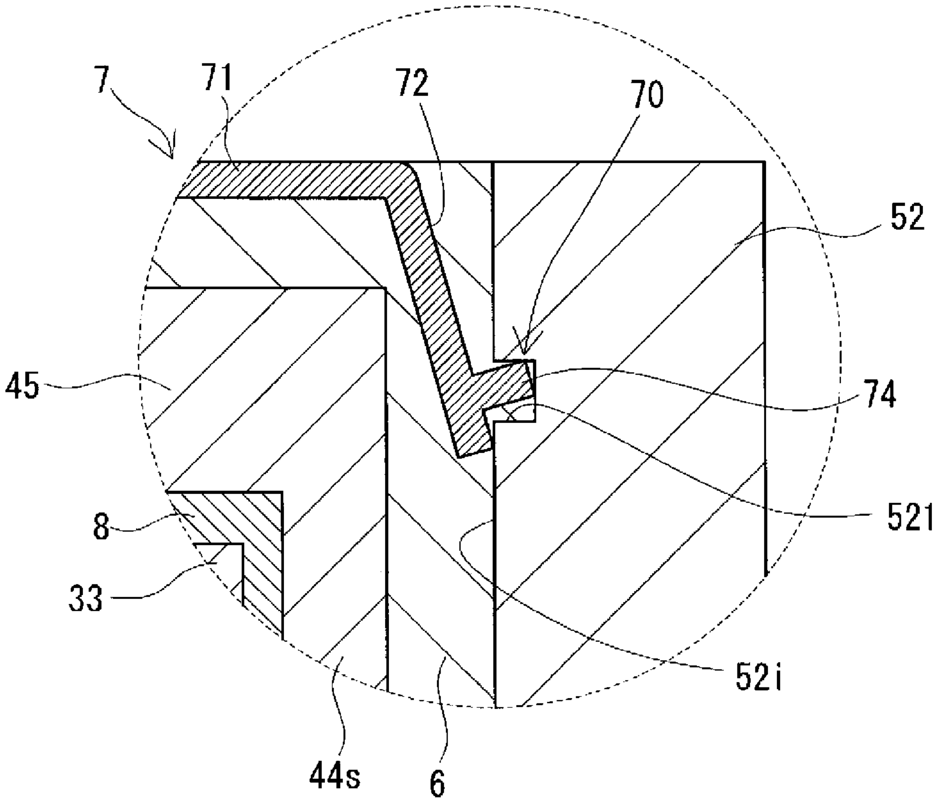
FIG. 7 is a schematic enlarged section showing the vicinity of an end portion of a supporting member provided in a reactor of a third embodiment.

A reactor of a third embodiment is described on the basis of FIG. 7. The reactor of the third embodiment differs from the first embodiment in how an end portion 70 of a supporting member 7 is stopped in contact with an inner surface 52*i* of a side wall portion 52. In the third embodiment, the end portion 70 of the supporting member 7 is stopped in contact with the inner surface 52*i* of the side wall portion 52 by the fitting of a projection and a recess. The configuration other than the form of stopping the end portion 70 of the supporting member 7 in contact is the same as in the first embodiment and not described.

The supporting member 7 of this example includes an upper piece 71, side pieces 72 and projections 74. The upper piece 71 and the side pieces 72 are the same as in the first embodiment. Springiness is imparted to the side piece 72 so that the side piece 72 is biased outward. The projection 74 projects toward the side wall portion 52 near an end part of the side piece 72. The shape of the projection 74 can be appropriately selected to be fittable into a recess 521 to be described later. The projection 74 of this example has a rectangular cross-sectional shape.

The case 5 of this example includes the recesses 521 in the side wall portion 52. The projections 74 are fit into the recesses 521. The shape of the recess 521 can be appropriately selected such that the projection 74 is fittable into the recess 521 with the side piece 72 biased. In this example, the projection 74 fit into the recess 521 is stopped in contact with the inner surface of the recess 521.

In this example, the end portion 70 of the supporting member 7 is stopped in contact with the inner surface 52*i* of the side wall portion 52 by the fitting of the projection 74 and the recess 521. Thus, the supporting member 7 is easily firmly fixed to the case 5. If the projections 74 and the recesses 521 can be fit, the supporting member 7 may be made of a resin material. A projection and a recess may be fit with the projection provided on the side wall portion 52 of the case 5 and the recess provided in the end portion 70 of the supporting member 7.

Fourth Embodiment

Figure 8:
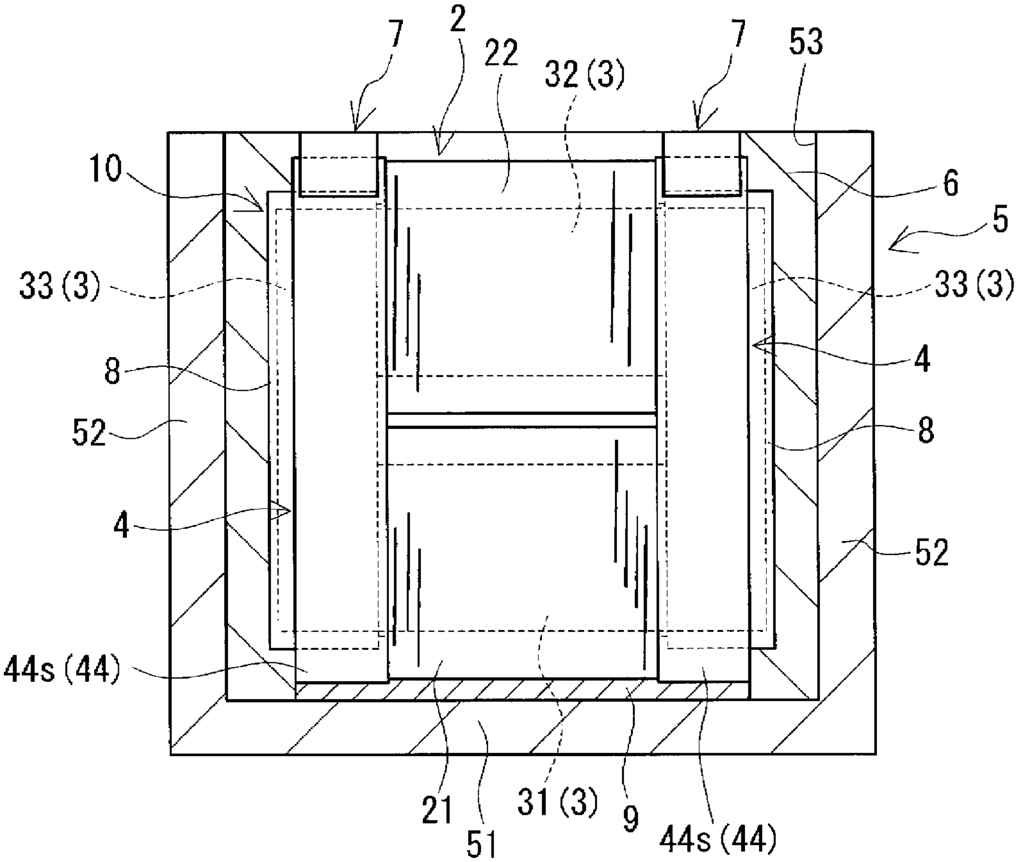
FIG. 8 is a schematic partial section showing an internal structure of a reactor of a fourth embodiment.

A reactor of a fourth embodiment is described on the basis of FIG. 8. The reactor of the fourth embodiment differs from the first embodiment in including an adhesive layer 9 between an assembly 10 and a bottom plate portion 51 of a case 5. The configuration other than the adhesive layer 9 is the same as in the first embodiment and not described.

The adhesive layer 9 is interposed between the assembly 10 and the bottom plate portion 51. In this example, the adhesive layer 9 is interposed between one winding portion 21 and both holding members 4 in the assembly 10 and the bottom plate portion 51. The assembly 10 can be firmly fixed to the case 5 by the adhesive layer 9. Thus, a movement of the assembly 10 is easily restricted. Therefore, the vibration of the assembly 10 due to vibration or a thermal shock possibly generated when the reactor operates is easily suppressed.

A formation region of the adhesive layer 9 can be appropriately selected. For example, the adhesive layer 9 may be formed in conformity with the size of the winding portion 21 and the adhesive layer 9 for the holding members 4 may be omitted. Supporting members 7 can also be arranged to press the assembly 10 toward the bottom plate portion 51. In this case, if the adhesive layer 9 is formed between the holding members 4 and the bottom plate portion 51, the assembly 10 and the case 5 can be more firmly fixed via the adhesive layer 9.

The adhesive layer 9 may be made of insulating resin. Then, electrical insulation between the assembly 10 and the case 5 is enhanced. Examples of the insulating resin include thermosetting resins and thermoplastic resins. The thermosetting resins are, for example, an epoxy resin, a silicone resin, an unsaturated polyester resin and the like. The thermoplastic resins are, for example, a PPS resin, an LCP and the like. The heat dissipation of the adhesive layer 9 may be improved by containing a ceramic filler in these resins. A commercially available adhesive sheet may be used as the adhesive layer 9. Further, the adhesive layer 9 may be formed by applying a commercially available adhesive to the assembly 10 and the bottom plate portion 51.

Fifth Embodiment

Figure 9:
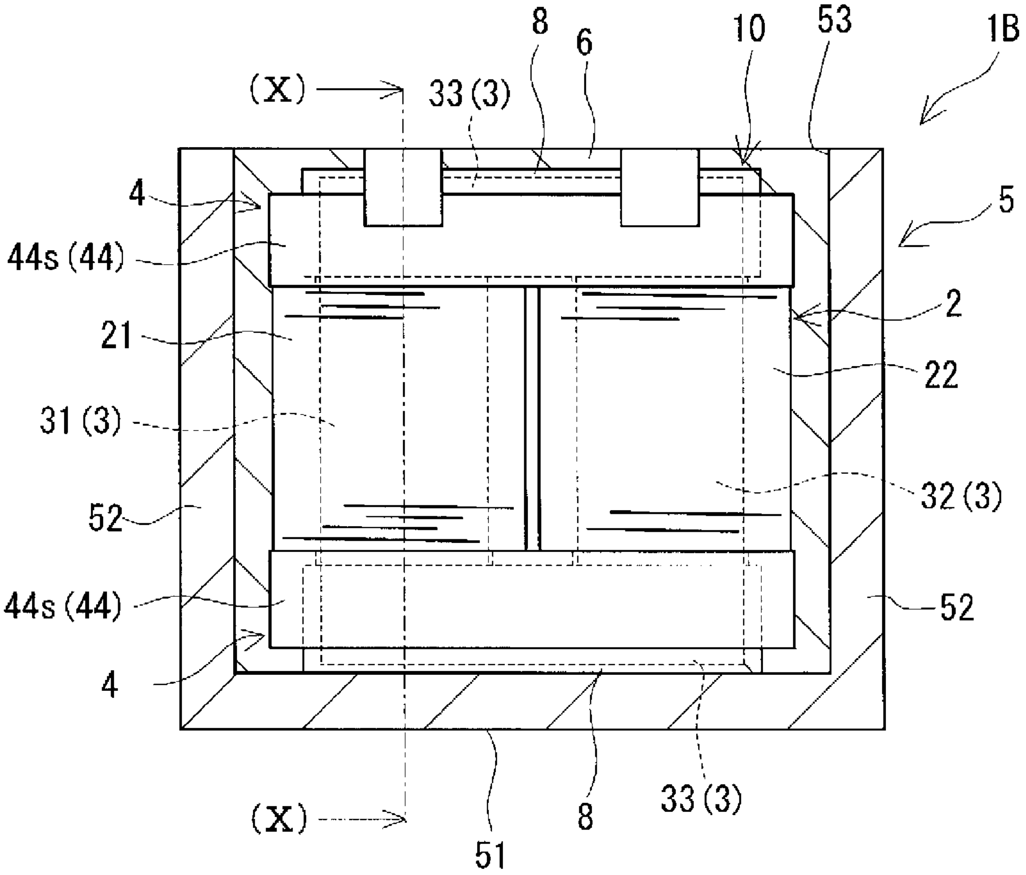
FIG. 9 is a schematic partial section showing an internal structure of a reactor of a fifth embodiment.
Figure 10:
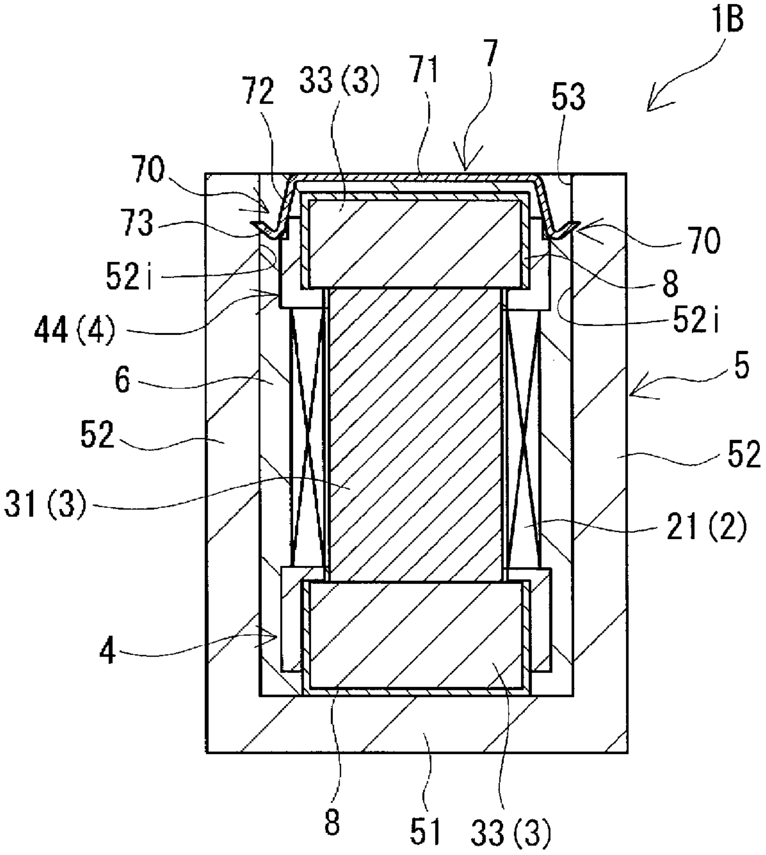
FIG. 10 is a schematic section along (X)-(X) shown in FIG. 9.

A reactor 1B of a fifth embodiment is described on the basis of FIGS. 9 and 10. The reactor 1B according to the fifth embodiment differs from the first embodiment in that a coil 2 is of an upright type to be described later. The configuration other than the arrangement mode of the coil 2 is the same as in the first embodiment and not described.

As shown in FIG. 9, the coil 2 of the upright type is so arranged that the axes of a pair of winding portions 21, 22 are orthogonal to a bottom plate portion 51. That is, the pair of winding portions 21, 22 are arranged in parallel in a direction from one facing side toward the other facing side of the side wall portion 52 of the case 5. In the case of the coil 2 of the upright type, an assembly 10 is placed with one outer core portion 33 held in contact with the bottom plate portion 51. The reactor 1B including the coil 2 of the upright type can reduce an installation area of the assembly 10 with respect to the bottom plate portion 51 as compared to a coil of the horizontally placed type. Generally, this is because a length of the assembly 10 along a direction orthogonal to both a parallel direction of the pair of winding portions 21, 22 and axial directions of the winding portions 21, 22 is shorter than a length of the assembly 10 along the axial directions of the winding portions 21, 22. Particularly, if the length of the assembly 10 along the axial directions of the winding portions 21, 22 is longer than a length of the assembly 10 along the parallel direction of the pair of winding portions 21, 22, the reactor 1B including the coil 2 of the upright type can reduce the installation area with respect to the bottom plate portion 51 as compared to the reactor 1A including the coil 2 of the vertically stacked type shown in FIG. 1. Thus, the reactor 1B including the coil 2 of the upright type is thin. Particularly, if the outer peripheral surfaces of the winding portions 21, 22 are substantially formed by flat surfaces, facing areas of the winding portions 21, 22 and the case 5 can be increased. In addition, if the outer peripheral surfaces of the winding portions 21, 22 are substantially formed by flat surfaces, intervals between the winding portions 21, 22 and the case 5 can be made substantially uniform. Thus, the reactor 1B including the coil 2 of the upright type can easily release heat generated in the assembly 10 to the case 5 and improve heat dissipation similarly to the reactor 1A including the coil 2 of the vertically stacked type shown in FIG. 1.

In this example, a supporting member 7 is so arranged that an upper piece 71 faces the outer core portion 33 and interposed regions are arranged to face an outer peripheral portion 44 of a holding member 4 as shown in FIG. 10.

An adhesive layer can be provided between the assembly 10 and the bottom plate portion 51 of the case 5 as in the fourth embodiment for the reactor 1B including the coil 2 of the upright type. The adhesive layer is interposed between the outer core portion 33 and the bottom plate portion 51. At this time, if the supporting members 7 are arranged to press the assembly 10 toward the bottom plate portion 51, the assembly 10 and the case 5 can be more firmly fixed via the adhesive layer.

LIST OF REFERENCE NUMERALS

1A, 1B reactor
10 assembly

2 coil, 21, 22 winding portion
3 magnetic core
31, 32 inner core portion, 33 outer core portion
4 holding member
43 through hole, 44 outer peripheral portion, **44*s*** side portion
440 first groove portion, **440*a* first surface, 440*b* second surface, 45** end surface portion
5 case
51 bottom plate portion, 52 side wall portion, **52*i*** inner surface
520 second groove portion, **520*a* first surface, 520*b* second surface, 521** recess
53 opening
6 sealing resin portion
7 supporting portion
70 end portion, 71 upper piece, 72 side piece, 73 folded piece, 74 projection
8 molded resin portion
9 adhesive layer

What is claimed is:

1. A reactor, comprising:
a coil including a pair of winding portions arranged in parallel;
a magnetic core arranged inside and outside the winding portions;
a case configured to accommodate an assembly including the coil and the magnetic core; and
a sealing resin portion filled into the case,
wherein:
the case includes a bottom plate portion, the assembly being placed on the bottom plate portion, a side wall portion configured to surround the assembly, and an opening facing the bottom plate portion, the opening having a rectangular planar shape,
the pair of winding portions are arranged such that a parallel direction of the pair of winding portions is orthogonal to the bottom plate portion,
the reactor includes a supporting member to be arranged along a short side direction of the opening, and
the supporting member includes an end portion stopped in contact with a facing inner surface of the side wall portion of the case such that the end portion of the supporting member is directly supported on the case while exerting a pressing force in a direction perpendicular to the facing inner surface of the side wall portion of the case.

2. The reactor of claim 1, wherein:
the magnetic core includes an outer core portion arranged outside the winding portions,
the reactor includes a holding member having a side portion configured to cover a surface of the outer core portion facing the side wall portion, and
the side portion includes a first groove portion, a part of the supporting member being fit into the first groove portion.

3. The reactor of claim 1, wherein the side wall portion includes a second groove portion in an inner surface facing the supporting member, a part of the supporting member being fit into the second groove portion.

4. The reactor of claim 1, wherein:
the supporting member is made of a metal material having a higher hardness than the side wall portion, and
the end portion of the supporting member include a part configured to bite into the respective inner surfaces of the side wall portion.

5. The reactor of claim 1, wherein:
one of both the end portion of the supporting member and the side wall portion includes a projection projecting toward a remaining one of both the end portion of the supporting member and the side wall portion, and
a recess is provided in the remaining one of the end portion of the supporting member and the side wall portion, the projection being fit into the recess.

6. The reactor of claim 1, comprising an adhesive layer interposed between the assembly and the bottom plate portion.

7. The reactor of claim 1, wherein:
the magnetic core includes an inner core portion arranged inside the winding portions and an outer core portion arranged outside the winding portions,
the assembly includes a molded resin portion configured to at least partially cover a surface of the outer core portion and cover a surface along a circumferential direction on an axial end part of the inner core portion.

8. The reactor of claim 1, wherein the supporting member includes:
at least two side pieces each extending in an obliquely downward direction from an end of the supporting member; and
at least two folded pieces each folded in an obliquely upward direction from an end of each of the at least two side pieces that is positioned at a tip end in a direction in which each of the at least two side piece extends, each of the at least two folded pieces including the end portion.

9. A reactor, comprising:
a coil including a pair of winding portions arranged in parallel;
a magnetic core arranged inside and outside the winding portions;
a case configured to accommodate an assembly including the coil and the magnetic core; and
a sealing resin portion filled into the case,
wherein:
the case includes a bottom plate portion, the assembly being placed on the bottom plate portion, a side wall portion configured to surround the assembly, and an opening facing the bottom plate portion, the opening having a rectangular planar shape,
the pair of winding portions are arranged such that axes of the both winding portions are orthogonal to the bottom plate portion,
the reactor includes a supporting member arranged along a short side direction of the opening, and
the supporting member includes an end portion stopped in contact with a facing inner surface of the side wall portion of the case such that the end portion of the supporting member is directly supported on the case while exerting a pressing force in a direction perpendicular to the facing inner surface of the side wall portion of the case.

10. The reactor of claim 9, wherein:
the magnetic core includes an outer core portion arranged outside the winding portions,
the reactor includes a holding member having a side portion configured to cover a surface of the outer core portion facing the side wall portion, and
the side portion includes a first groove portion, a part of the supporting member being fit into the first groove portion.

11. The reactor of claim 9, wherein the side wall portion of the case includes a second groove portion in an inner surface facing the supporting member, a part of the supporting member being fit into the second groove portion.

12. The reactor of claim 9, wherein:

the supporting member is made of a metal material having a higher hardness than the side wall portion, and the end portion of the supporting member include parts configured to bite into the respective inner surfaces of the side wall portion.

13. The reactor of claim 9, wherein:

one of both the end portion of the supporting member and the side wall portion includes a projection projecting toward a remaining one of the end portion of the supporting member and the side wall portion, and a recess is provided in the remaining one of the end portion of the supporting member and the side wall portion, the projection being fit into the recess.

14. The reactor of claim 9, comprising an adhesive layer to be interposed between the assembly and the bottom plate portion.

15. The reactor of claim 9, wherein:

the magnetic core includes an inner core portion arranged inside the winding portions and an outer core portion arranged outside the winding portions, the assembly includes a molded resin portion configured to at least partially cover a surface of the outer core portion and cover a surface along a circumferential direction on an axial end part of the inner core portion.

16. The reactor of claim 9, wherein the supporting member includes:

at least two side pieces each extending in an obliquely downward direction from an end of the supporting member; and at least two folded pieces each folded in an obliquely upward direction from an end of each of the at least two side pieces that is positioned at a tip end in a direction in which each of the at least two side piece extends, each of the at least two folded pieces including the end portion.

* * * * *